US006845428B1

(12) United States Patent
Kedem

(10) Patent No.: US 6,845,428 B1
(45) Date of Patent: *Jan. 18, 2005

(54) METHOD AND APPARATUS FOR MANAGING THE DYNAMIC ASSIGNMENT OF RESOURCES IN A DATA STORAGE SYSTEM

(75) Inventor: Ishay Kedem, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,173

(22) Filed: Mar. 24, 2004

Related U.S. Application Data

(63) Continuation of application No. 09/004,105, filed on Jan. 7, 1998, now Pat. No. 6,725,331.

(51) Int. Cl.[7] .............................................. G06F 12/00
(52) U.S. Cl. ........................ 711/117; 711/112; 711/156
(58) Field of Search ......................... 711/111–113, 117, 711/120, 121, 156; 710/10, 17–19, 74; 714/6–9, 42, 48

(56) References Cited

U.S. PATENT DOCUMENTS

| | | | |
|---|---|---|---|
| 5,493,649 A | 2/1996 | Slivka et al. | |
| 5,790,775 A | 8/1998 | Marks et al. | |
| 5,799,304 A | 8/1998 | Miller | |
| 5,819,310 A | 10/1998 | Vishlitzky et al. | |
| 5,864,837 A | 1/1999 | Maimone | |
| 5,950,230 A | 9/1999 | Islam | |
| 5,953,351 A | 9/1999 | Hicks | |
| 6,073,218 A | 6/2000 | DeKoning et al. | |
| 6,725,331 B1 | 4/2004 | Kedem | |

*Primary Examiner*—Matthew Kim
*Assistant Examiner*—Woo H. Choi
(74) *Attorney, Agent, or Firm*—Wolf, Greenfield & Sacks, P.C.

(57) ABSTRACT

A method and apparatus for managing a dynamic assignment of resources in a storage system. In one aspect, a storage system includes a plurality of storage devices, a plurality of controllers that each is coupled to at least one of the plurality of storage devices and controls access to the one of the plurality of storage devices, a memory that is globally accessible to each of the plurality of controllers; first means for creating in the memory a global table that stores information that specifies dynamic assignments of resources in the storage system, and second means for creating a local table in at least one of the plurality of controllers that includes all of the information stored in the global table. In another aspect, the storage system stores information written by a data processing system that accesses units of information in the storage system using a logical volume address, and the local and global tables are indexed by the logical volume address. In another aspect, each of the plurality of controllers includes updating means, responsive to the one of the plurality of controllers being powered up, for automatically updating the local table in the one of the plurality of controllers. In another aspect, the system includes means for verifying that the information stored within the local tables is consistent with the information stored within the global table.

23 Claims, 11 Drawing Sheets

LOCALLY STORED STATIC
CONFIGURATION TABLES

Disk Adapter 110A

| DA-Specific Target Number | Logical Device Volume# (DV#) | Mirror Number | Hot Spare Flag |
|---|---|---|---|
| 0 (Drive 112) | DV0 | M1 | No |
| 1 (Drive 112) | DV1 | M1 | No |
| 2 (Drive 114) | DV2 | M2 | No |
| 3 (Drive 114) | D/C | D/C | Yes |
| 4 (Drive 116) | DV0 | M2 | No |
| 5 (Drive 116) | DV1 | M2 | No |
| 6 (Drive 118) | DV2 | M1 | No |
| 7 (Drive 118) | D/C | D/C | Yes |

*FIG. 2A*
(Prior Art)

Disk Adapter 110B

| DA-Specific Target Number | Logical Device Volume# (DV#) | Mirror Number | Hot Spare Flag |
|---|---|---|---|
| 0 (Drive 116) | DV0 | M2 | No |
| 1 (Drive 116) | DV1 | M2 | No |
| 2 (Drive 118) | DV2 | M1 | No |
| 3 (Drive 118) | D/C | D/C | Yes |
| 4 (Drive 112) | DV0 | M1 | No |
| 5 (Drive 112) | DV1 | M1 | No |
| 6 (Drive 114) | DV2 | M2 | No |
| 7 (Drive 114) | D/C | D/C | Yes |

*FIG. 2B*
(Prior Art)

LOCALLY STORED
STATIC CONFIGURATION TABLES

| Logical Device Volume (DV#) | BCV Assignment Flag | Mirror Mask (# of Mirrors) |
|---|---|---|
| DV0 | No | 2-Way |
| DV1 | No | 2-Way |
| DV2 | Yes | 2-Way |

*FIG. 3*

(Prior Art)

FIG. 4A (Prior Art)

LOCALLY STORED DYNAMIC CONFIGURATION TABLE

Disk Adapter 110A

| DA-Specific Target Number | Mirror Mask (# of Mirrors) | Mirror Number | DV# | DC/BCV Flags |
|---|---|---|---|---|
| 0 | 2-Way (May be Increased) | ///// | DV0 | ///// |
| 1 | 2-Way (May be Increased) | ///// | DV1 | ///// |
| 2 | 2-Way (May be Increased) | Dynamically Assigned | Dynamically Assigned | Dynamically Assigned |
| 3 | Dynamically Assigned | Dynamically Assigned | Dynamically Assigned | Dynamically Assigned |

FIG. 4B (Prior Art)

Disk Adapter 110B

| DA-Specific Target Number | Mirror Mask (# of Mirrors) | Mirror Number | DV# | DC/BCV Flags |
|---|---|---|---|---|
| 0 | 2-Way (May be Increased) | ///// | DV0 | ///// |
| 1 | 2-Way (May be Increased) | ///// | DV1 | ///// |
| 2 | 2-Way (May be Increased) | Dynamically Assigned | Dynamically Assigned | Dynamically Assigned |
| 3 | Dynamically Assigned | Dynamically Assigned | Dynamically Assigned | Dynamically Assigned |

GLOBALLY ACCESSIBLE DYNAMIC CONFIGURATION TABLE

| Disk Adapter # (DA#) | DA-Specific Target Number | Mirror Mask (# of Mirrors) | Mirror Number | Logical Device Volume# (DV#) | DC/BCV Flags |
|---|---|---|---|---|---|
| DA 110A | 0 | 2-Way (May be Increased) | | DV0 | |
| DA 110A | 1 | 2-Way (May be Increased) | | DV1 | |
| DA 110A | 2 | 2-Way (May be Increased) | Dynamically Assigned | Dynamically Assigned | Dynamically Assigned |
| DA 110A | 3 | Dynamically Assigned | Dynamically Assigned | Dynamically Assigned | Dynamically Assigned |
| DA 110B | 0 | 2-Way (May be Increased) | | DV0 | |
| DA 110B | 1 | 2-Way (May be Increased) | | DV1 | |
| DA 110B | 2 | 2-Way (May be Increased) | Dynamically Assigned | Dynamically Assigned | Dynamically Assigned |
| DA 110B | 3 | Dynamically Assigned | Dynamically Assigned | Dynamically Assigned | Dynamically Assigned |

*FIG. 5*
(Prior Art)

GLOBAL DYNAMIC ASSIGNMENT TABLE (GDAT)
(Stored Locally With Each Disk Adapter and in Globally Accessible Memory)

| Byte 0 | Byte 1 | Byte 2 | Byte 3 | Byte 4 | Byte 5 | Byte 6 | Byte 7 |
|---|---|---|---|---|---|---|---|
| DC/BCV Flags | Hot Spare State/Director Number | Mirror/Mask Number | DC/BCV Flags | Primary/Secondary DC/BCV DV# | | Hot Spare Target Number | |

GLOBAL DYNAMIC ASSIGNMENT TABLE (GDAT)
(With Hot Spare Assignments)

| Logical Device Volume# (DV#) | Hot Spare Mirror Number | Hot Spare State/Director Number (Byte 1) | | Hot Spare Target Number (Bytes 6 & 7) |
|---|---|---|---|---|
| | | Hot Spare Active Flag | Hot Spare Director Number | |
| DV0 | D/C | No | D/C | D/C |
| DV1 | M3 | Yes | DA 110A | 3 |
| DV2 | M3 | Yes | DA 110B | 3 |

GLOBAL DYNAMIC ASSIGNMENT TABLE (GDAT)
(With DC/BCV Devices in Use)
Primary (Non-BC/BCV) DV# Entries

| Logical Data Volume# (DV#) | DC/BCV Connection Established (Byte 0) | Mirror Mask Number (Byte 2) | | | Secondary DC/BCV DV# (Bytes 4 & 5) |
|---|---|---|---|---|---|
| | | Not Active Mirror Mask | Prim. Mirror Number | Sec. Mirror Number | |
| DV0 | No | D/C | D/C | D/C | D/C |
| DV1 | Yes | D/C | D/C | D/C | DV2 |

Secondary (BC/BCV) DV# Entries

| Logical Data Volume# (DV#) | DC/BCV Connection Established (Byte 0) | Mirror Mask Number (Byte 2) | | | Primary DC/BCV DV# (Bytes 4 & 5) |
|---|---|---|---|---|---|
| | | Not Active Mirror Mask | Prim. Mirror Number | Sec. Mirror Number | |
| DV2 | Yes | M2 | M3 | M1 | DV1 |

METHOD AND APPARATUS FOR MANAGING THE DYNAMIC ASSIGNMENT OF RESOURCES IN A DATA STORAGE SYSTEM

CROSS REFERENCES TO RELATED APPLICATIONS

This application claims the benefit under 35 U.S.C. §120 as a continuation of U.S. non-provisional application Ser. No. 09/004,105, filed Jan. 7, 1998 now U.S. Pat. No. 6,725,331 and hereby incorporated by reference herein.

FIELD OF THE INVENTION

The present invention relates to data storage systems. More particularly, the present invention is directed to a method and apparatus for managing the dynamic assignment of resources in a data storage system.

DESCRIPTION OF THE RELATED ART

Storage systems including devices such as disk drives are used in many different types of computer or data processing systems to store data. Disk drives generally include one or more disks of a recording medium (e.g., a magnetic recording medium or an optical recording medium) on which information can be written for storage purposes, and from which stored information can be read. Large data storage systems commonly include on the order of one-hundred disk drives, with each disk drive including several disks. One such mass storage system is the SYMMETRIX line of disk arrays available from EMC Corporation of Hopkinton, Mass. The SYMMETRIX line of disk arrays is described in numerous publications from EMC Corporation, including the SYMMETRIX model 55XX product manual, P-N200-810-550, rev. F, February, 1996.

Typically, data in a mass data storage system is accessed from a host computer in units called "logical volumes," with the host computer writing or reading data to the storage system using a logical volume address or "logical device volume number" (hereafter DV#). Each physical storage device (e.g., a disk drive) in a storage system may store a single logical volume. Alternatively, it is possible in many systems to configure each physical storage device to store two or more logical volumes. For example, each disk drive may be configured to have two logical volumes stored on it, in which case the system would be said to have a two-to-one logical-to-physical relationship.

Some mass data storage systems allow for one or more resources of the system to be dynamically assigned during operation of the system, resulting in a change from the way these resources were allocated at the time the system was initially configured. One example of this involves the dynamic assignment, during operation, of one or more of the system's physical devices (e.g., a disk drive or a portion thereof) to store a particular logical volume. To support such dynamic assignment, one or more physical devices may be configured so that they are not statically assigned to store a particular logical volume addressable by the host. Instead, these storage devices are configured to be reserved for special operations during which they may be dynamically assigned by the storage system to temporarily store a particular logical volume addressable by the host. This dynamic assignment may be of the entire physical device, or some portion thereof.

One example of the dynamic assignment of physical resources involves configuring certain storage devices to be reserved as "hot spares" that are available to be dynamically assigned to, for example, replace failing storage devices. When it is determined that the number of errors occurring on a particular storage device is excessive and that a hard failure is probable, the storage system can dynamically assign an available one of its hot spares to address the problem. First, the system dynamically assigns the hot spare device as an additional mirror of the logical volume stored on the failing device, so that accesses to the logical volume can be serviced by the spare. The system then dynamically copies the data from the failing device to the available spare without interrupting operation of the storage system. The failing device is then replaced. Thereafter, the system dynamically copies the data from the hot spare to the newly installed device. Once the data is copied to the replacement device, the storage system dynamically reassigns the hot spare device so that it no longer acts as a mirror for the logical volume that was stored on the failing device and is returned to the pool of available spares for use in addressing potential failures with other devices.

Applicant has discovered that a number of problems can arise in handling the dynamic assignment of resources in a storage system, particularly when failures occur in the components of the system that store the information regarding the dynamic assignments. Several specific examples of the ways in which problems can arise are discussed below. However, before discussing those examples, an explanation is provided of the architecture of an existing SYMMETRIX data storage system, and the manner in which the dynamic assignment of devices is handled in that system. It should be appreciated that the challenges associated with the dynamic assignment of devices are not peculiar to the SYMMETRIX architecture, and apply to all types of storage systems that support the dynamic assignment of resources. Thus, the description of the existing SYMMETRIX system is provided below merely for illustrative purposes.

FIG. 1 is a block diagram of an existing SYMMETRIX data storage system 1 coupled to a host data processor 2. The data storage system includes a number of disk drives (e.g., drives 112, 114, 116, 118, 132, 134, 136, and 138) and a number of controllers. Some of the controllers 102, 104 are referred to as host adapters, and others (110A, 110B, 130A and 130B) are referred to as disk adapters or DA's. The host adapters and disk adapters operate together, along with a read-write memory 100 that is globally accessible to all of the host and disk adapters, to transfer data between the host data processor 2 and the disk drives. It should be appreciated that the data storage system typically will include many more host adapters, disk adapters and disk drives than are shown in FIG. 1. It should further be appreciated that each host adapter, disk adapter, and disk drive typically has a resident processor (e.g., a microprocessor) and local memory that are used to control its operation. The host adapters 102 and 104 communicate with the host data processor 2 via a bus 3.

Communication between the host adapters 102 and 104, the disk adapters 110A, 110B, 130A and 130B, and the globally accessible memory 100 is accomplished over busses 106 and 108. Each of the disk adapters is coupled to a subset of the disk drives (112, 114, 116, 118, 132, 134, 136, and 138) in the system, and controls communication with the drives to which it is coupled in a manner discussed briefly below. The disk adapters communicate with their respective disk drives via one or more buses 120, 122, 124, 126, 140, 142, 144, and 146, which may be of any type. For example, the buses can be SCSI (Small Computer System Interface) buses.

Globally accessible memory 100 includes three sections. A first section stores a number of tables used by the host and disk adapters to control communication between the host processor 2 and the disk drives (e.g., 112, 114). A second section serves as a data cache that stores read/write data blocks, i.e., the system illustrated in FIG. 1 is a cached storage system. The third section is used as a service area for a service processor 148.

The manner in which the host adapters 102 and 104 and disk adapters 110A, 110B, 130A and 130B operate to enable the host data processor 2 to read data from and write data to the disk drives in the cached system of FIG. 1 will now briefly be described. The caching operations are performed by the host adapters and disk adapters in a manner that is transparent to the host data processor. A read operation typically causes one of the host adapters 102, 104 to scan a directory in the data cache portion of the memory 100 for the requested data, and when the requested data is in the cache, the host adapter transfers the data from the cache to the host processor 2. If the requested data is not in the cache, the disk adapters (e.g., 110A, 110B) determine on which disk drive (e.g., 112, 114) the data is stored, and transfer the data from the disk drive to the cache. One of the host adapters then transfers the requested data from the cache area of memory 100 to the host data processor. For write operations, the data initially is written to the cache by the host adapters, which typically indicate to the host data processor 2 that the write is complete as soon as the data is verified as having been stored, error-free, in the cache. The disk adapter (e.g., 110A) associated with the particular disk drive (e.g., 112) on which the data is to be stored then asynchronously destages the data to the disk drive.

The illustrative storage system shown in FIG. 1 further includes a service processor 148 that is coupled to each of the host adapters 102 and 104 and disk adapters 110A, 110B, 130A and 130B. Service processor 148, which can be implemented as a PC (e.g., a laptop), provides diagnostic and maintenance utilities for the system, as well as a communication channel into the system for service personnel.

To map between the logical volume addresses that the host processor 2 uses to access data stored in the storage system and the physical locations on the disk drives at which the data is actually stored, the storage system includes a number of configuration tables. The existing system illustrated in FIG. 1 employs two types of tables. First, there is a set of static configuration tables that store the configuration information for each disk drive (or portion thereof) when the storage system initially is configured. This configuration information can be loaded into the static tables via the service processor 148. The static information does not change dynamically during operation of the storage system, and generally is stored in non-volatile memory so that it will not be lost if power is interrupted. Second, there is a set of dynamic tables that store configuration information that changes dynamically. Examples of the configuration tables for the existing data storage system of FIG. 1 are discussed below in connection with FIGS. 2–5, with FIGS. 2–3 showing the static tables and FIGS. 4–5 showing the dynamic tables.

In the existing system of FIG. 1, each of the disk adapters stores, in its local memory, two static configuration tables that each includes information concerning the static configuration of the system resources. FIGS. 2–3 are examples of these static configuration tables, and illustrate the static tables for disk adapters 110A and 110B (FIG. 1). The first static configuration table is shown in FIGS. 2A–B. As seen from these figures, the static configuration tables for disk adapters 110A and 110B each includes a number of entries indexed by a "target number" of the disk adapter. Each portion of a disk drive that stores a logical volume is assigned a unique target number on each disk adapter to which the disk drive is coupled. Thus, each target number for each disk adapter is an address unique to that disk adapter that identifies a specific group of memory locations (e.g., that can be used to store a logical volume) within the storage space of a disk drive associated with the disk adapter. As seen from FIGS. 2A–B, when a disk drive is coupled to more than one disk adapter (e.g., drive 112 is coupled to disk adapters 110A and 110B), the drive can be assigned different target numbers on the different disk adapters (e.g., drive 112 includes target numbers "0" and "1" on DA 110A and target numbers "4" and "5" on DA 110B).

In FIGS. 2A–B, the parenthetical entry next to each of the "DA-Specific Target Number" entries identifies the physical device in FIG. 1 that stores the target (i.e., the specific group of memory locations that can be used to store a logical volume) identified by the target number. These parenthetical entries are not included in the actual tables, but are shown in FIGS. 2A–B for the purpose of illustration. As shown, the configuration tables of FIG. 2 reflect that the system of FIG. 1 is configured to have a two-to-one logical-to-physical relationship, with each disk drive storing two logical volumes. As discussed above, the logical-to-physical relationship is configurable.

As shown in FIGS. 2A–B, the table entries of disk adapter 110A indexed by target numbers "0–3" include entries identical to those of disk adapter 110B indexed by target numbers "4–7". Similarly, the table entries for target numbers "0–3" of disk adapter 110B include entries identical to those of target numbers "4–7" of disk adapter 110A. The reason for this duplication is that, as shown in FIG. 1, each of disk drives 112, 114, 116 and 118 is coupled to both disk adapters 110A and 110B. This is done for fault tolerance reasons. In this respect, disk adapters 110A and 110B generally do not service requests for access to the same logical volumes simultaneously. Rather, disk adapter 110A only accesses drives 112 and 114 during normal operation, and disk adapter 110B only accesses drives 116 and 118. This is represented in the tables of FIGS. 2A–B in that the table entries for targets that are serviced by each of disk adapters 110A and 110B during normal operation are highlighted (i.e., not "shadowed"), whereas the shadowed entries in each of the two tables are used only as standby targets in the event of a failure of the disk adapter responsible for servicing these targets during normal operation.

In the example illustrated in the tables of FIG. 2A-B, if the storage system were to detect a hardware failure caused by the failure of disk adapter 110A, then disk adapter 110B would service both its highlighted targets (i.e., targets "0–3") and its shadowed targets (i.e., targets "4–7"), while disk adapter 110A would be taken off-line. In this manner, targets "0–3" of disk adapter 110A, which normally are serviced by disk adapter 110A, could continue to be accessed after disk adapter 110A failed. When the failure was corrected, disk adapters 110A and 110B would return to servicing requests to their highlighted targets in the normal manner.

As should be appreciated from the foregoing, the system of FIG. 1 configures the disk adapters to operate in pairs so that one disk adapter can take over the duties of the other should a failure occur with one of the pair of disk adapters. In the system of FIG. 1, disk adapters 110A and 110B constitute a first DA pair 110 and disk adapters 130A and 130B constitute a second DA pair 130. The use of DA pairs provides fault tolerance in the event that a disk adapter fails, because each disk adapter has the capability of servicing all requests to the targets of the disk adapter with which it is paired. Together, each pair of disk adapters forms a dual-initiator (borrowed from the SCSI convention wherein "initiators" are devices that control operations on a bus) system, because each of the buses (e.g., 120, 122, 124, 126) for accessing the disk drives is coupled to two disk adapters.

As shown in the figures, one field for each entry in the static configuration tables of FIGS. 2A–B is a "mirror number." It should be appreciated that many storage systems employ mirroring techniques for fault tolerance and performance reasons. For example, to protect critical data from equipment malfunction or other events that could result in a loss of data, many data storage systems are configured to store multiple mirrors of the same logical volume on two or more disk adapter targets, most typically on different disk drives. When a logical volume is written, the write is carried out to all of the mirrors of the logical volume. By storing data in two or more mirrors, the data is not lost when a disk drive containing a "mirrored" logical volume fails, so long as at least one other disk drive containing a mirror of the logical volume remains operational. The use of mirroring techniques also can increase system performance, because two or more mirrors of the same logical volume can be accessed in parallel.

Mirroring operations generally are transparent to the host data processor 2 (FIG. 1), so that the host is unaware that more than one mirror of a particular logical volume exists. From the perspective of the host processor, the logical volume is accessed using a single logical volume address. The logical volumes seen by the host data processor 2 correspond with the logical device volume numbers (DV#) stored in the table entries. However, as seen from FIGS. 2A–B, multiple targets can correspond to the same logical volume (e.g., target "0" on disk adapter 110A and target "0" on disk adapter 110B both correspond to logical volume DV0). The disk adapters store the mirror number in the static configuration tables of FIGS. 2A–B to enable the storage system to distinguish between the mirrors. For example, when mirroring is used to increase system performance by enabling simultaneous access to multiple mirrors of a logical volume, the disk adapters can use the mirror numbers in the static configuration tables to perform load balancing among the multiple mirrors to maximize system performance.

When a target fails while storing a mirror of a logical volume, the storage system, without interruption, can automatically use the target(s) storing the other mirrors of that logical volume to continue to service requests to the logical volume. When the defective disk drive is replaced, the system then may reestablish the replacement disk drive as a valid target and automatically copy the data for the logical volume to the new disk drive. Generally, the new disk drive will be configured identically to the one it replaced so that no reconfiguration of the system is required.

As discussed above, some mass storage systems employ a function called dynamic sparing, wherein a hot spare device can be dynamically assigned as an additional mirror for a logical volume. In the illustrative system described in connection with FIGS. 2A–B, certain targets (e.g., portions of disk drives) are statically configured to serve as hot spares. This designation will not change unless the system is reconfigured. Thus, to enable the disk adapters to identify which of its targets are configured for use as hot spares, the static configuration tables shown in FIGS. 2A–B include a hot spare flag field. Only those targets that are reserved as hot spares have a "Yes" in this flag field. Because the logical volume number (DV#) and mirror number of the hot spare targets will be assigned dynamically, as explained below, and because the tables shown in FIGS. 2A–B represent only static configurations, the entries in these fields are irrelevant, as indicated by the notation "don't care" ("D/C") in the tables.

As discussed above, there are other types of dynamic resource assignments that the storage system may employ in addition to dynamically assigning some targets as hot spares. Another example involves a feature provided in the SYMMETRIX line of disk arrays known as "dual copy" or "business continuance volumes" ("DC/BCVs"). In accordance with this feature of SYMMETRIX, the storage system is configured to include one or more DC/BCV logical volumes. A DC/BCV volume can be used to establish a logical "connection" with another logical volume. The DC/BCV volume is used to make at least one additional copy or mirror of the logical volume to which it is logically connected. After the copy is made, the storage system may de-establish the connection to create a snapshot of the contents of the copied logical volume at a particular point in time. The snapshot copy can then be used to perform various operations (e.g., making a backup of the data or generating a report based on its contents) without disrupting or holding up access to the logical volume that was copied. When the desired operations have been completed, the logical connection between the DC/BCV logical volume and the copied logical volume may be reestablished, so that the DC/BCV volume can be updated with all changes that occurred to the copied volume while the logical connection had been de-established. In this manner, the DC/BCV volume can be used to provide a copy of the logical volume at a later point in time. Alternatively, once the need for the point-in-time copy of the logical volume ceases, the DC/BCV volume can be dynamically assigned to another logical volume, or can be kept idle and available for use to make a point-in-time copy of another logical volume.

In the existing SYMMETRIX system described above in connection with FIGS. 1 and 2A–B, information regarding the assignment of particular logical volumes as being dedicated DC/BCV volumes is included in a separate static configuration table stored in the local memory in each of the disk adapters. This table is identical for each disk adapter. A simplified example of this second static table that includes only the logical volumes (DV0–DV2) statically configured for the targets of disk adapters 110A and 110B (FIG. 1) is shown in FIG. 3. This table is indexed by logical volume number and includes two fields for each logical volume listed. One of these fields is a "DC/BCV Assignment Flag," and indicates whether the logical volume is statically configured to be a DC/BCV logical volume. In the example shown, only logical volume DV2 is assigned to be a DC/BCV logical volume. The other field in the table of FIG. 3 is a "Mirror Mask" that identifies the number of mirrors statically assigned to mirror each of the logical volumes. In the example shown, each of the logical volumes in the table (DV0–DV2) is configured to have two mirrors, as indicated by the designation of a "2-way" mirror in the mirror mask field.

The tables discussed above in connection with FIGS. 2A–B and 3 address only static assignments. To support dynamic resource assignments, such as the hot spare targets and DC/BCV volumes discussed above, the existing system described above further employs additional tables that reflect the dynamic configuration of the system. FIGS. 4A–B and 5 illustrate examples of these dynamic configuration tables. A table of the type shown in FIGS. 4A–B is stored in the local memory of each disk adapter. A table of the type shown in FIG. 5 is stored in a memory location (e.g., globally accessible memory 100 of FIG. 1) that is accessible to both disk adapters in each DA pair (e.g., the table in FIG. 5 is accessible to each of the disk adapters 110A and 110B of DA pair 110). For the sake of simplicity, the locally stored dynamic configuration tables of only disk adapters 110A and 110B are shown, respectively, in FIGS. 4A and 4B, and the globally accessible dynamic table of only DA pair 110 is shown in FIG. 5. It should be understood that similar tables are provided for each disk adapter and DA pair in the system.

The tables in FIGS. 4A–B, like the static tables of FIGS. 2A–B, are indexed by target number. However, unlike those static tables, the dynamic tables of FIGS. 4A–B include entries only for those targets that the disk adapter accesses during normal operation, i.e., the targets that correspond to the DA's highlighted entries in the static tables of FIGS. 2A–B. Each of the entries in the tables of FIGS. 4A–B can be changed dynamically in response to the dynamic assignment of resources in the system. Using the two examples discussed above, these dynamic assignments include the assignment of hot spares to replace failing targets, and the dynamic establishment of DC/BCV connections. The manner in which each of these dynamic assignments is handled is discussed below.

As reflected in the tables of FIGS. 2A–B, target "3" of disk adapter 110A and target "3" of disk adapter 110B each is reserved as a hot spare. As mentioned above, the logical volume fields in the static configuration tables for these "hot spare" targets are meaningless, as these targets are assigned only dynamically to store a particular logical volume. Thus, the dynamic configuration tables of FIGS. 4A–B include a field for each target that indicates the logical volume to which the target is assigned. For those targets that are not hot spares (e.g., target "0" of DA 110A), the value stored in this field will be the logical volume to which the target was statically assigned in the configuration table of FIGS. 2A–B. However, for the hot spare targets, this field will be dynamically updated to control the dynamic assignment of the hot spare to a specified logical volume. For the hot spare targets, each of the disk adapters looks to the dynamic configuration table of FIGS. 4A–B in its local memory to determine whether its hot spares have been assigned to mirror a logical volume, and if so, which logical volume each has been assigned to mirror.

In addition to the logical volume field, the dynamic tables of FIGS. 4A–B also include two additional fields that are used to support the dynamic assignment of hot spare targets. First, a "mirror mask" indicates the total number of mirrors of the logical volume. When a hot spare has been dynamically assigned, this number will equal the number of mirrors that were statically assigned to the logical volume, plus one to reflect the addition of another mirror in the form of the dynamically assigned hot spare. Second, a "mirror number" indicates the mirror number of the target, which is analogous to the mirror number in the static table of FIGS. 2A–B. When a hot spare is dynamically assigned, the mirror number for the hot spare target will equal the highest mirror number statically assigned to the logical volume, plus one.

For example, referring to the examples of FIGS. 2A–B and 4A–B, if hot spare target "3" of disk adapter 110A were dynamically assigned to logical volume DV1, then in the table entry for target "3" in the locally stored dynamic table for disk adapter 110A: (1) the DV# entry would reflect that target "3" was dynamically assigned to mirror logical volume DV1; (2) the mirror number entry would reflect that target "3" was mirror M3 of logical volume DV1 (since mirrors M1 and M2 already exist); and (3) the mirror mask entry for target "3" would reflect that a total of three mirrors now exist for logical volume DV1.

In addition to the entry for each dynamically assigned hot spare target, one field of the table entries for the other targets in the tables of FIGS. 4A–B can be dynamically updated to support the use of hot spares. Specifically, it should be appreciated that when a hot spare is dynamically assigned to a logical volume, the number of mirrors assigned to that volume is increased over the number that was statically configured. Thus, the mirror mask field in the dynamic tables of FIGS. 4A–B for the targets that are not hot spares can be dynamically updated to reflect an increase in the number of mirrors of the logical volume stored by the target. Referring to the example discussed above wherein a hot spare is added for logical volume DV1, the mirror mask entries for target "1" on DA 110A and target "1" on DA 110B are updated to reflect that a total of three mirrors now exist for logical volume DV1.

As mentioned above, the existing SYMMETRIX system also employs a dynamic configuration table (shown in FIG. 5) that is globally accessible to each disk adapter in the system. As shown in FIG. 5, the globally accessible dynamic configuration table is a collection of the identical information included in the locally stored dynamic configuration tables of FIGS. 4A–B. The primary purpose of this globally accessible dynamic configuration table is to support the fault tolerant capabilities provided by using dual-initiator DA pairs. As discussed above, when one disk adapter of a DA pair fails, the other disk adapter in the pair will take over control of its shadow targets that were previously controlled by the failed disk adapter. To do so, the portion of the globally accessible dynamic assignment table reflecting dynamic assignments (made by the failed disk adapter) for those shadowed targets is copied to the disk adapter taking over the failed disk adapter's targets. Updating of the globally accessible dynamic configuration table is controlled by the disk adapters. For example, after a dynamic assignment of a hot spare is altered, the disk adapter whose local dynamic configuration table was changed in assigning or removing the hot spare updates the globally accessible table of FIG. 5 with the appropriate changes to the entries for the hot spare target and any other targets (of this or another disk adapter) for the impacted logical volume (e.g., the mirror mask entries are updated for targets of other disk adapters that store the same logical volume). For example, if target "3" of disk adapter 110A were invoked as a hot spare for logical volume DV1, then when disk adapter 110A updated the globally accessible dynamic configuration table, it would update not only the entries that correspond to the targets referenced in its local table, but also would update the entry in the global table for target "1" of disk adapter 110B, so that the mirror mask of this target reflects that logical volume DV1 now has three mirrors.

Each of the disk adapters periodically polls the contents of the globally accessible dynamic configuration table to determine whether any changes have been made to the mirror mask entries for any of its targets. If, pursuant to this polling, a disk adapter determines that the mirror mask entry for one of its targets has been changed, the disk adapter will update its local dynamic configuration table to reflect this change. Referring to the above-discussed example, after disk adapter 110A updates the globally accessible dynamic configuration table in response to target "3" of disk adapter 110A being invoked as mirror M3 of logical volume DV1, a periodic polling routine performed by disk adapter 110B will detect that the mirror mask entry for target "1" of disk adapter 110B has been changed in the globally accessible table. Thus, disk adapter 110B will detect this change in the globally accessible table and change its local table (FIG. 4B) accordingly.

The dynamic tables of FIGS. 4A–B and 5 also include an additional field ("DC/BCV Flags") that is used to support the dynamic assignment of DC/BCV volumes. The specific manner in which these flags operate is specific to the manner in which DC/BCV operates, and is not relevant to the present application. However, it should be appreciated that each entry in the dynamic configuration tables of FIGS. 4A–B and 5 that corresponds to a target that stores a DC/BCV volume (e.g., target "2" of DA 110A stores a logical volume DV2 that is configured as a DC/BCV volume in FIG. 3) can change dynamically depending upon whether a DC/BCV is established. A DC/BCV connection is established between logical volumes by updating the entries in the local dynamic configuration tables of the disk adapters that have targets that are impacted by the establishment of the DC/BCV connection. In a manner similar to that described above with hot spare assignments, if the DC/BCV Flags or any of the other entries in the local table of a disk adapter are changed during the establishment/de-establishment of a DC/BCV connection, then the disk adapter updates the globally accessible dynamic configuration table to reflect the necessary changes. Subsequently, the other disk adapters in the system, pursuant to periodic polling routines, will detect any changes made to the globally accessible dynamic configuration table that affect their targets and will update their local tables accordingly.

Although the above-described existing SYMMETRIX system works well, Applicant has discovered some unusual situations, discussed below, wherein the dynamic assignment of resources can be handled in a better manner. What is needed, therefore, is an improved method and apparatus for managing the dynamic assignment of resources in a data storage system.

SUMMARY OF THE INVENTION

In one embodiment of the invention, a storage system is provided, including: a plurality of storage devices; a plurality of controllers that each is coupled to at least one of the plurality of storage devices and controls access to the one of the plurality of storage devices; a memory that is globally accessible to each of the plurality of controllers; first means for creating a global table, in the memory, that stores information that specifies dynamic assignments of resources in the storage system; and second means for creating a local table in at least one of the plurality of controllers that includes all of the information stored in the global table.

In another embodiment of the invention, a storage system is provided, including: a plurality of storage devices; a plurality of controllers that each is coupled to at least one of the plurality of storage devices and controls access to the one of the plurality of storage devices; and a memory that is globally accessible to each of the plurality of controllers, the memory including a global table that stores information that specifies dynamic assignments of resources in the storage system. At least one of the plurality of controllers includes a local table that includes all of the information stored in the global table.

In another embodiment of the invention, a method is provided for managing dynamic assignments of resources in a storage system including a plurality of storage devices, a plurality of controllers that each is coupled to at least one of the plurality of storage devices, and a memory that is globally accessible to each of the plurality of controllers. The plurality of controllers control the dynamic assignments of resources based upon information stored within the plurality of controllers. The method comprises steps of: (A) creating a global table, in the memory, that stores information concerning all the dynamic assignments of resources in the storage system; (B) creating a local table in each of the plurality of controllers that includes all of the information stored in the global table; and (C) controlling the dynamic assignments of resources based upon the information in the local tables.

In yet another embodiment of the invention a storage system is provided, including: a plurality of storage devices; a plurality of controllers that each is coupled to at least one of the plurality of storage devices and controls access to the one of the plurality of storage devices; and a memory that is globally accessible to each of the plurality of controllers, the memory including a global table that stores information that specifies dynamic assignments of resources in the storage system. At least one of the plurality of controllers includes a local table that includes all of the information stored in the global table.

In another embodiment of the invention, a method is provided for managing dynamic assignments of resources in a storage system. The storage system includes a plurality of storage devices, a plurality of controllers that each is coupled to at least one of the plurality of storage devices, and a memory that is globally accessible to each of the plurality of controllers. The plurality of controllers control the dynamic assignments of resources based upon information stored within the plurality of controllers. The method includes the steps of: (A) creating a global table, in the memory, that stores information concerning all the dynamic assignments of resources in the storage system; (B) creating a local table in each of the plurality of controllers that includes all of the information stored in the global table; and (C) controlling the dynamic assignments of resources based upon the information in the local tables.

In another embodiment of the invention, a storage system is provided to store information written by a data processing system that accesses units of information in the storage system using a logical volume address. The storage system includes: a plurality of storage devices; a plurality of controllers that each is coupled to at least one of the plurality of storage devices and controls access to the one of the plurality of storage devices; and a memory that stores a dynamic configuration table that includes information specifying dynamic assignments of resources in the storage system, the dynamic configuration table being indexed by the logical volume address.

In another embodiment of the invention, a storage system is provided to store information written by a data processing system that accesses units of information in the storage system using a logical volume address. The storage system includes: a plurality of storage devices; a plurality of controllers that each is coupled to at least one of the plurality of storage devices and controls access to the one of the plurality of storage devices; a memory; and means for creating, in the memory, a dynamic configuration table that includes information specifying dynamic assignments of resources in the storage system, the dynamic configuration table being indexed by the logical volume address.

In another embodiment of the invention, a storage system is provided that includes: a plurality of storage devices; a plurality of controllers that each is coupled to at least one of the plurality of storage devices and controls access to the one of the plurality of storage devices, each of the plurality of controllers including a local memory to store a local table that includes information that specifies dynamic assignments of resources in the storage system; and a memory to store a global table that stores information that specifies the dynamic assignments of resources in the storage system, the memory being accessible by each of the plurality of controllers. Each one of the plurality of controllers includes updating means, responsive to the one of the plurality of controllers being powered up, for automatically updating the local table in the one of the plurality of controllers.

In another embodiment of the invention, a method of managing a storage system is provided. The storage system includes a plurality of storage devices, a plurality of controllers that each is coupled to at least one of the plurality of storage devices and controls access to the one of the plurality of storage devices, each of the plurality of controllers including a local table that includes information that specifies dynamic assignments of resources in the storage system, and a global table that stores information that specifies the dynamic assignments of resources in the storage system and is accessible by each of the plurality of controllers. The method comprises the step of: (A) when one of the plurality of controllers is powered up, automatically updating the local table in the one of the plurality of controllers.

In another embodiment of the invention, a method of managing dynamic assignments of resources in a storage system is provided. The storage system includes a plurality of storage devices and a plurality of controllers, each of the plurality of controllers being coupled to at least one of the plurality of storage devices, at least one of the plurality of controllers being arranged to control the dynamic assignments of resources based upon information stored within a first table in the storage system. The storage system further includes a second table including information specifying the dynamic assignment of resources. The method includes the step of: (A) verifying that the information stored within the first table is consistent with information stored within the second table.

In another embodiment of the invention, a storage system includes: a plurality of storage devices; at least first and second dynamic assignment tables that each includes information specifying dynamic assignments of resources in the storage system; a plurality of controllers, each coupled to at least one of the plurality of storage devices, wherein at least one of the plurality of controllers is arranged to control the dynamic assignments of resources in the storage system based upon the information stored within the first dynamic assignment table; and verification means for verifying that the information stored within the first dynamic assignment table is consistent with the information stored within the second dynamic assignment table.

In another embodiment of the invention, a method for managing dynamic assignments of resources in a storage system is provided. The storage system includes a plurality of storage devices and a plurality of controllers that control the dynamic assignments of resources, each of the plurality of controllers being coupled to at least one of the plurality of storage devices. The method comprises the steps of: (A) creating first and second copies of a table that specifies the dynamic assignments of resources of the storage system; and (B) storing the first and second copies of the table in two different locations in the storage system.

In another embodiment of the invention, a method for managing dynamic assignments of resources in a storage system is provided. The storage system includes a plurality of storage devices and a plurality of controllers that control the dynamic assignments of resources, each of the plurality of controllers being coupled to at least one of the plurality of storage devices, each of the plurality of controllers having a local memory that stores information specifying the dynamic assignments of resources of the storage system. The method comprises the steps of: (A) identifying which one of the plurality of controllers has stored in its local memory a most current version of the information specifying the dynamic assignments of resources; and (B) using the contents of the local memory of the one of the plurality of controllers identified in step (A) to update the contents of the local memory in the other controllers.

BRIEF DESCRIPTION OF THE DRAWINGS

FIGS. 2A–B represent locally stored data configuration tables for disk adapters in an existing data storage system;

FIG. 3 illustrates a second type of locally stored static configuration table stored in each disk adapter in the existing data storage system;

FIGS. 4A–B illustrate dynamic configuration tables locally stored within the disk adapters in the existing data storage system;

FIG. 5 is a dynamic configuration table that is globally accessible to multiple disk adapters in the existing data storage system;

FIG. 7 illustrates the format of the local and global dynamic assignment tables in accordance with one embodiment of the present invention;

FIG. 8 illustrates the fields of the dynamic assignment table of FIG. 7 that support the dynamic assignment of hot spares;

FIGS. 9A–B illustrate the fields of the dynamic assignment tables of FIG. 7 that support the dynamic assignment of DC/BCV volumes;

DETAILED DESCRIPTION OF THE INVENTION

Figure 1:
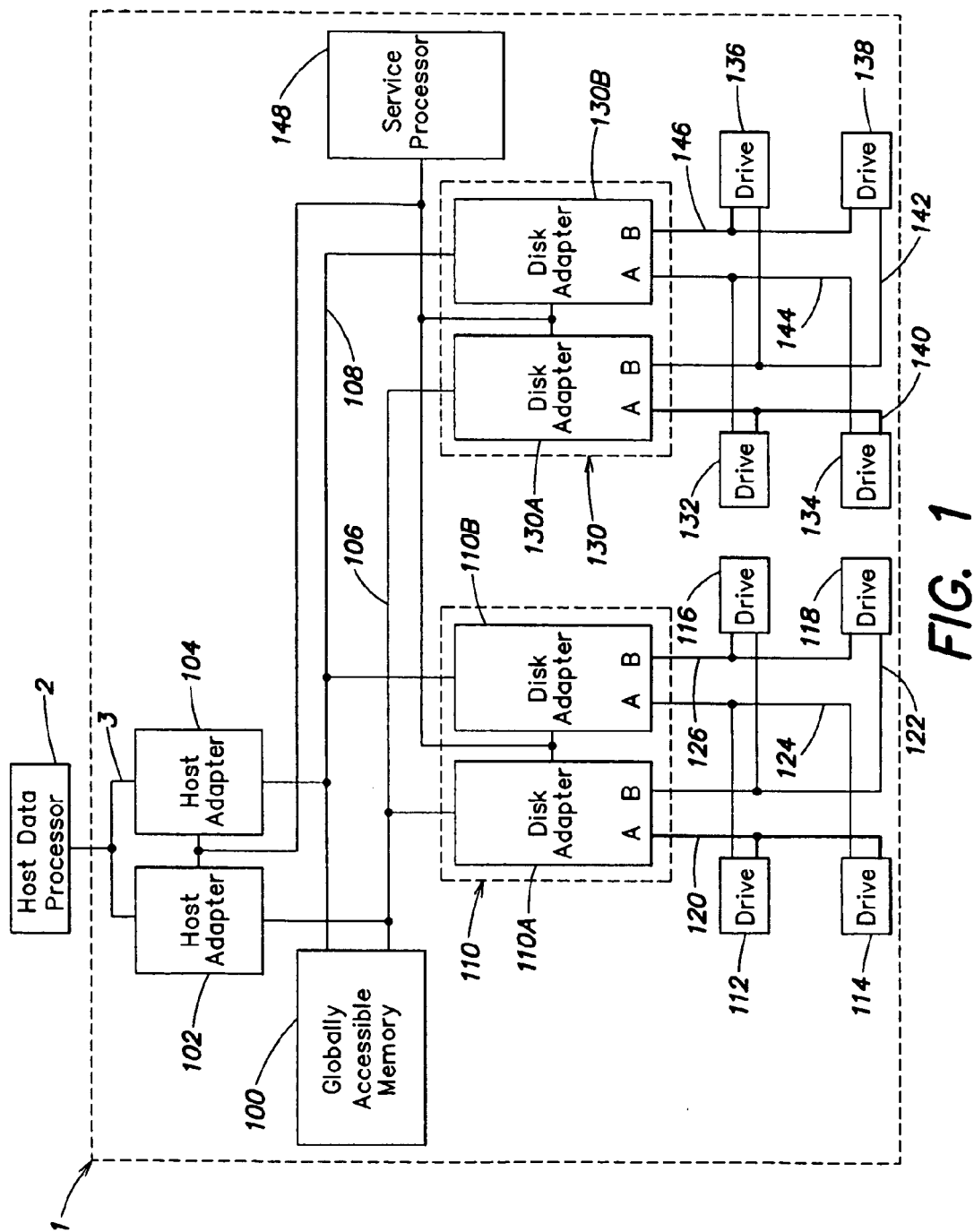
FIG. 1 is a block diagram of a mass data storage system on which the present invention can be implemented.

It should be appreciated that it is not uncommon for devices in a data storage system to fail. As opposed to static configuration assignments that generally are reproduced easily, the dynamic assignment of system resources presents a greater risk that dynamic configuration information will be lost if a device that stores the dynamic configuration information fails, or if its information becomes corrupted. It is this possibility of device failures and/or corruption that Applicant has determined, in certain unusual circumstances, present challenges to preventing the loss of the dynamic configuration information in the existing system described above. Several of these situations are described below to assist in understanding the nature of the problems solved by the present invention.

A first situation that may arise in the existing system described above is that the information in the local dynamic configuration table for a disk adapter can potentially get corrupted. A disk adapter in the existing system can detect that its dynamic configuration information has become corrupted or contains inaccurate information, and therefore will not to use this information. Instead, in response to detecting corrupted or inaccurate information in its local dynamic configuration table, the disk adapter in the existing system will initialize its local dynamic configuration table to nullify all information regarding any previously-made dynamic assignments.

It should be appreciated that, as discussed above, it is possible that a failing disk adapter previously may have copied all of the relevant information regarding the dynamic assignments of its targets to the globally accessible dynamic configuration table (FIG. 5). This information therefore might be available to each of the disk adapters in the system. The existing system, however, does not provide the capability of automatically downloading the information in the globally accessible dynamic configuration table (FIG. 5) to the local dynamic configuration tables (FIGS. 4A–B) of the disk adapters, other than in response to updates of the global table in the manner described above. Rather, to update the local dynamic configuration table of a disk adapter from the globally accessible table, the service processor 148 (FIG. 1) needs to be employed to copy the information, which is a time consuming process that interrupts the normal operation of the storage system.

One reason that each disk adapter in the existing system does not automatically copy the contents of the globally accessible dynamic configuration table to its local dynamic configuration table when corruption or inaccuracy in the contents of the local table is detected is that the disk adapter cannot necessarily trust that the information in the globally accessible configuration table is accurate. For example, if the system just recently was powered up, then the globally accessible dynamic configuration table (FIG. 5), which generally is stored in volatile memory, would contain no information, e.g., it would contain all zeros. The disk adapter therefore would not want to copy the information from the globally accessible dynamic configuration table in such a situation.

A second situation may arise in the existing system when a disk adapter fails after having made a dynamic assignment, even if the information relating to the dynamic assignment previously had been updated to the globally accessible memory. This situation may be illustrated by referring to the tables shown in FIGS. 2–5. If hot spare target "3" of disk adapter 110A were dynamically assigned as mirror M3 of logical volume DV1, disk adapter 110A would change its local dynamic configuration table (FIG. 4A), and then would update the globally accessible dynamic configuration table (FIG. 5) to reflect this dynamic assignment. If disk adapter 110A subsequently failed and was replaced with a new device, the local configuration table of the new disk adapter would not include the dynamic configuration information for the hot spare target "3" of disk adapter 110A. That is, when the failed disk adapter is replaced, the replacement device will have a local dynamic configuration table that does not include any information concerning the dynamic assignments made by the failed device.

By comparing a code that is generated based upon the contents of its local dynamic configuration table against a previously-generated code stored in memory, the disk adapter in the existing system will recognize that its local dynamic configuration table contains inaccurate information. As noted above, however, because the disk adapter cannot necessarily trust the contents of the globally accessible dynamic configuration table (FIG. 5) (even though it might contain accurate information in some situations), in response to the detection of inaccurate information in its local dynamic configuration table (FIGS. 4A and 4B), the disk adapter will initialize its local dynamic configuration table to nullify all information regarding any previously-made dynamic assignments of resources. The replacement disk adapter simply is unable to tell the state of the storage system in which it is being inserted. For example, the disk adapter is unable to tell whether it is being powered up in a storage system that has been operating smoothly (wherein the globally accessible dynamic configuration table contains valid information) or whether it is being powered up in a storage system that is being powered up or used for the first time, in which cases the globally accessible dynamic configuration table (FIG. 5) would contain inaccurate information. As with the first situation, the service processor 148 (FIG. 1) will be employed to copy information from the global to the local table.

A third situation may arise when a disk adapter is included in a dual-initiator pair. As noted above, when one disk adapter of a dual-initiator pair fails, the other disk adapter will copy information from the globally accessible dynamic configuration table to identify the dynamic assignments previously made by the failed device, and will take over the operations performed by the failed device. For example, if disk adapter 110A were to fail, disk adapter 110B will take over servicing the targets "0–3" of disk adapter 110A by servicing its "shadowed" targets according to the dynamic assignments reflected in the globally available dynamic configuration table of FIG. 5. However, after disk adapter 110B has taken over, additional dynamic assignments may be made regarding the targets ("0–3" for DA 110A and "4–7" for DA 110B) previously serviced by the failed disk adapter 110A. If such additional dynamic assignments are made and disk adapter 110A subsequently is replaced by a new device, the replacement device will have a local dynamic configuration table (FIG. 4A) that will not include any of the dynamic assignments made either by the failed disk adapter 110A, or by disk adapter 110B during the time when it serviced its shadow targets "4–7".

As with the first and second situations described above, although the new device that replaces a failed disk adapter does not have accurate information in its local dynamic configuration table (FIGS. 4A–B), all of the relevant information might be stored within the global dynamic configuration table (FIG. 5). However, as stated above in connection with the discussion of the first and second situations, the disk adapters in the existing system are unable to trust the contents of the globally accessible dynamic configuration table in all situations and therefore the existing system provides no capability for automatically downloading information from the globally accessible dynamic configuration table to the local table of a disk adapter, other than in response to updates of the global table in the manner described above. Rather, the service processor 148 (FIG. 1) must be employed to perform such a function.

In either of the second or third situations discussed above, wherein a disk adapter is replaced by a new device, the newly installed disk adapter in the existing system would execute a power-up routine when the device is installed and powered up. If the information in the globally accessible dynamic configuration table (FIG. 5) were guaranteed to be valid when any disk adapter was powered up, the power-up routine for each disk adapter could automatically download the relevant information to its local dynamic configuration table. Thus, for the situation wherein a disk adapter fails during operation of the system and is replaced by a new device, the new device could automatically download the needed information and begin operating with up-to-date information in its local dynamic configuration table. However, such a power-up routine would not work when the entire storage system is being used for the first time or when the storage system is being powered up concurrently with the disk adapter, because in either of these situations there is no valid data in the global dynamic configuration table. In these cases, if each disk adapter were to execute an power-up routine that automatically downloaded information from the global dynamic table and began operating, problems could be encountered because each disk adapter would be relying upon invalid data for specifying its dynamic assignments. To avoid that problem, on power up, the disk adapters in the existing system do not automatically download information from the globally accessible dynamic configuration table. Rather, in response to a detected inaccuracy in the data in their local dynamic configuration tables, each disk adapter in the existing system simply initializes its local table to reflect no dynamic resource assignments. If it is determined that the global dynamic assignment table does, in fact, contain accurate information (for example, when a new disk adapter is powered up in a currently operating system), then the service processor 148 (FIG. 1) is employed to download that information to the local table of the disk adapter. As stated above, this is a time consuming process that interrupts the normal operation of the storage system.

According to the present invention, an improved method and apparatus has been developed for managing the dynamic assignment of resources in a storage system. In one embodiment of the present invention, static and dynamic configuration tables are employed in a manner similar to the above-described existing system, but a different scheme is employed for managing the dynamic tables.

In one embodiment, the present invention is implemented on a SYMMETRIX storage system having an architecture similar to the existing system described above in connection with FIG. 1. Thus, much of the description below refers to the system of FIG. 1, and explains how the present invention can be implemented on that system. However, it should be appreciated that the present invention is not limited in this respect. The present invention can be implemented on any storage system (some having very different architectures from that shown in FIG. 1) wherein the dynamic assignment of resources is supported.

In one embodiment of the invention, static configuration tables are employed in each disk adapter that are identical to those described above in connection with the existing system. However, it should be appreciated that the organization and information contained in these tables is provided merely for illustrative purposes, and that other arrangements are possible. For example, it is not necessary to have separate static and dynamic tables, as the information can be combined in a single table. In addition, although the tables described above include entries to support DC/BCV and the use of hot spares, it should be appreciated that the tables can be modified to support the dynamic assignment of other types of resources.

Figure 6:
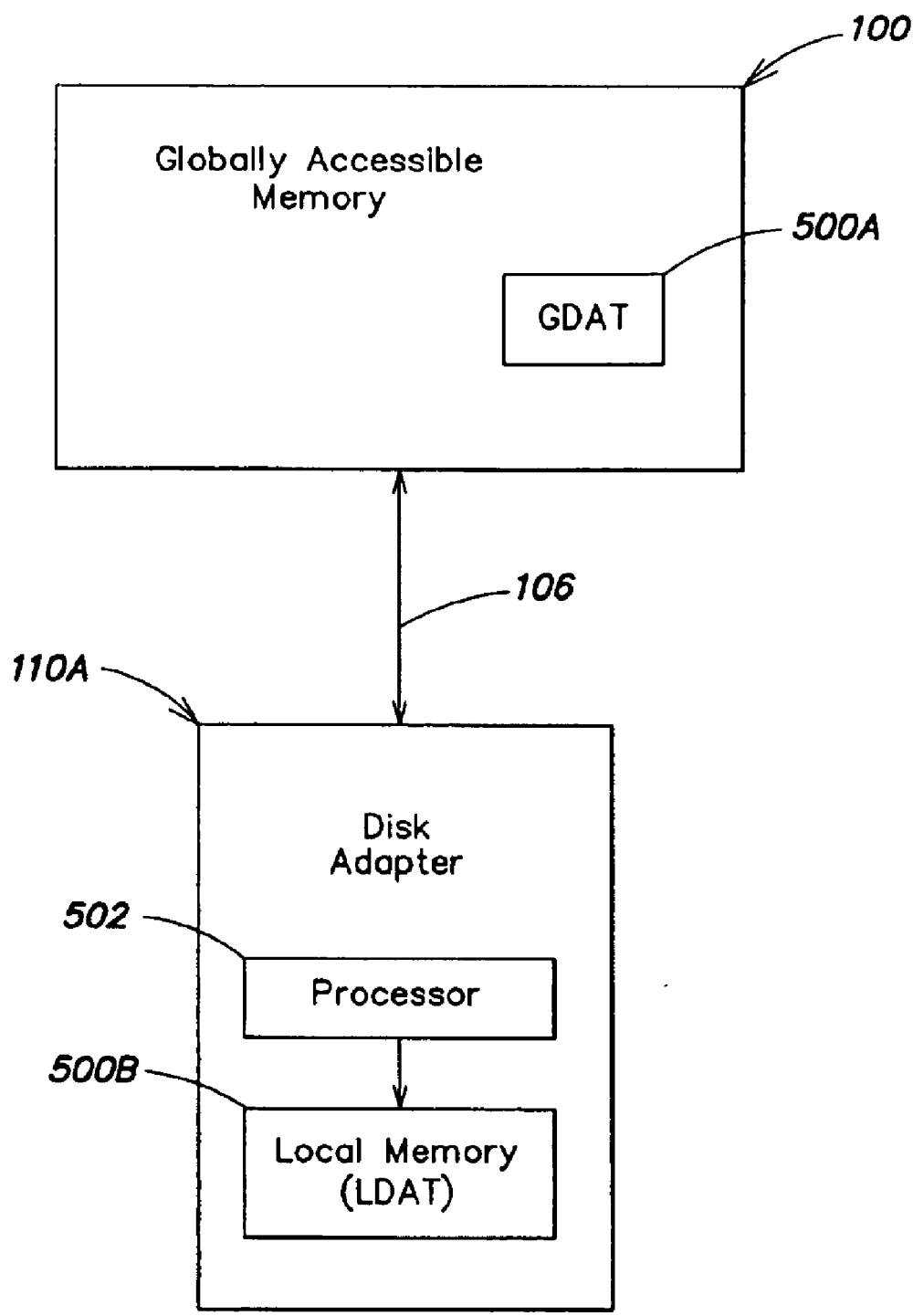
FIG. 6 is a block diagram of a disk adapter and globally accessible memory in accordance with one embodiment of the present invention.

In one embodiment of the invention, a global dynamic assignment table (GDAT) having information concerning all of the global assignments in the storage system is stored in the system at a location accessible to all of the disk adapters in the system. For example, the GDAT 500A can be stored in a section of the globally accessible memory 100 of FIG. 1, as shown in FIG. 6. However, it should be appreciated that the GDAT can be stored in any other location accessible to all the disk adapters (e.g., 110A, 110B, 130A and 130B) in the storage system 1 (FIG. 1). Each of the disk adapters (e.g., disk adapters 110A, 110B, 130A and 130B) also includes (preferably in non-volatile memory) a local dynamic table (LDAT) 500B (FIG. 6) that, in contrast to the local dynamic configuration tables in the existing system, contains information identical to that stored in the GDAT. As discussed below in connection with an explanation of how these tables are managed and used, employing an LDAT that includes all the information in the GDAT provides a number of advantages.

According to one embodiment of the invention, the LDATs and the GDAT are indexed by logical volume. Thus, the LDATs and GDAT each includes only one entry for each logical volume (i.e., one entry per DV#) stored in the system, even if the system is configured to maintain several mirrored versions of the same logical volume. Although advantageous, it should be appreciated that the invention is not limited in this respect, and that the dynamic assignment tables can be indexed in a different way.

FIG. 7 shows the format of the information included in each entry (eight bytes) 501 of the LDATs and the GDAT according to one embodiment the invention. This format includes a number of bytes to support the dynamic assignment of hot spares and DC/BCV volumes as discussed below. It should be appreciated that the present invention is not limited to this format, as different information can be provided to support the dynamic assignment of other types of resources. Furthermore, the number of bytes dedicated to each field, as well as the arrangement of the fields may vary. To facilitate understanding, the fields in the GDAT and LDAT entries that are used to support hot spare and DC/BCV volume assignments are discussed separately below in connection with FIGS. 8 and 9, respectively. However, it should be appreciated that a hot spare can be invoked for a target assigned as a DC/BCV copy of a logical volume in the system, so that all of the fields in the table entry 501 can be employed simultaneously.

FIG. 8 shows those fields (bytes "1" and "6–7") of an LDAT/GDAT table 500 that are used to support dynamic hot spare assignments. As shown, the table is indexed by logical volume number (DV#). The information shown in FIG. 8 corresponds to a system having the static configuration shown in FIGS. 2A–B and 3. Although only three table entries are shown (DV0–DV2) for this example, it should be appreciated that a typical LDAT or GDAT will include many more entries. Furthermore, the table 500 shown in FIG. 8 corresponds to a system such as the one shown in FIG. 1, but that includes only disk adapters 110A and 110B and the disk drives (112, 114, 116 and 118) on which the three logical volumes (DV0–DV2) are stored. It should be understood that a typical data storage system on which the present invention can be implemented will include a substantially larger number of disk adapters and disk drives than illustrated in this example.

As shown in FIG. 8, byte "1" of each eight-byte entry in table 500 includes at least one bit (i.e., a "hot spare active flag") indicating whether a hot spare has been activated for the logical volume that corresponds to the table entry. If the hot spare active flag of a logical volume indicates that a hot spare is assigned to that logical volume, then other information in the table entry uniquely identifies the hot spare target by identifying the disk adapter and target number for the hot spare. In particular, bits in byte "1" specify a "hot spare director number" that identifies the disk adapter, and bytes "6–7" identify a target on that disk adapter that is the hot spare. If the hot spare active flag of a logical volume is not set, the other fields in byte "1" and those in bytes "6–7" are ignored. It should be appreciated that since the fields shown allow only one each of the hot spare director and target number to be specified, only a single hot spare can be invoked for any logical volume using the GDAT/LDAT format shown in FIG. 8. However, the present invention is not limited in this respect. Additional bits optionally may be added to each entry in the GDAT/LDAT to support the designation of multiple hot spare targets for each logical volume.

Byte "1" of FIG. 8 also includes two bits that identify the mirror number that the hot spare stores for the logical volume to which the table entry corresponds, much like the mirror number included in the dynamic configuration table of FIGS. 4A–B discussed above. The hot spare is assigned a mirror number equal to the highest mirror number previously assigned to the logical volume, plus one. For example, if logical volume DV0 had two mirrors (i.e., M1 and M2) before a hot spare was invoked for it, then the hot spare would be assigned mirror number M3.

In the example shown in FIG. 8, the hot spare active flags for logical volumes DV1 and DV2 are set, indicating that a hot spare has been invoked for those logical volumes. In the table, the hot spare director number for entries DV1 and DV2 uniquely identify disk adapters 110A and 110B, respectively. The target number for each entry is "3." Thus, by examining its LDAT, disk adapter 110A knows that its target number "3" is dynamically assigned as mirror M3 of logical volume DV1. Similarly, disk adapter 110B can determine from its LDAT that its target number "3" is mirror M3 of logical volume DV2. As reflected in the static assignment table of FIG. 3, DV2 is assigned as a DC/BCV logical volume. Thus, in this example, a hot spare has been invoked as a mirror M3 of this DC/BCV logical volume DV2. Because the hot spare active flag for logical volume DV0 does not indicate that a hot spare has been invoked, the other table entries shown in FIG. 8 are not used (indicated in the figure by don't care or D/C entries).

FIGS. 9A and 9B each shows several fields (bytes "0," "2" and "4–5") of the LDAT/GDAT table 500 that are used to support dynamic DC/BCV assignments. These fields are part of the same table 500 shown in FIG. 8. As such, the table entries shown in FIGS. 9A–B are indexed by logical volume number (DV#), correspond to a system having the static configuration shown in FIGS. 2A–B and 3, and correspond to a system such as the one shown in FIG. 1, but that includes only two disk adapters 110A and 110B that store the three logical volumes (DV0–DV2) on the disk drives (112, 114, 116 and 118) serviced thereby. According to the static assignment table shown in FIG. 3, logical volume DV2 is assigned as a DC/BCV logical volume, and logical volumes DV0 and DV1 are not so assigned.

As discussed above, a statically configured DC/BCV logical volume (e.g., DV2) may be dynamically assigned as a DC/BCV copy of another logical volume in the system (e.g., DV0 or DV1). When a DC/BCV assignment is made, the volume of which a copy is made (e.g., DV0 or DV1) is referred to as the "primary" DC/BCV volume, and the DC/BCV volume (e.g., DV2) that makes the point-in-time copy is referred to as the "secondary" DC/BCV volume. In the embodiment of the invention shown in FIGS. 9A–B, the entries in the GDAT/LDAT of table 500 differ for the primary and secondary DC/BCV volumes. The format of the entries for the primary DC/BCV volumes is shown in FIG. 9A, and the format for the secondary DC/BCV volumes is shown in FIG. 9B.

The table 500 of FIGS. 9A–B includes a field (bytes "4–5") that specifies the DC/BCV "connection." In an entry for a primary DC/BCV volume, this field identifies the secondary volume to which the DC/BCV "connection" has been made. Similarly, in an entry for a secondary DC/BCV volume, this field identifies the primary volume to which the DC/BCV "connection" has been made. Thus, in the example illustrated wherein a DC/BCV connection has been made between logical volumes DV1 and DV2, the primary logical volume DV1 includes an entry in bytes "4–5" that identifies secondary logical volume DV2 as the DC/BCV volume assigned to it, and the table entry for secondary logical volume DV2 includes an entry in bytes "4–5" that identifies primary logical volume DV1 as the logical volume to which it is assigned.

The GDAT/LDAT illustrated in FIGS. 9A–B also includes a field in byte "0" entitled "DC/BCV connection established" that identifies whether a DC/BCV connection currently is established between the two logical volumes pointing to each other in bytes "4–5". When a DC/BCV connection is established, a "Yes" is included in this field for both the primary and secondary volumes. In the example of FIGS. 9A–B, a "Yes" is provided in the DC/BCV connection established entries for both logical volumes DV1 and DV2.

As discussed above, a statically assigned DC/BCV volume (e.g., DV2 in FIG. 3) can include multiple mirrors. In one embodiment of the invention, when a DC/BCV connection is established for such a volume, only a single one of the mirrors or targets that stores the DC/BCV volume (e.g., target "3" of DA 110A in FIG. 2A) actually is used to create the point-in-time copy. Thus, the embodiment of the GDAT/LDAT illustrated in FIGS. 9A–B includes a field that identifies which mirror of the secondary logical volume is to be established as a mirror of the primary logical volume. This information is included in a mirror mask (discussed below) that also indicates which mirror number of the primary logical volume the secondary logical volume is assigned to. However, it should be appreciated that the present invention is not limited to employing only a single target of the secondary logical volume to create the point-in-time copy, and that multiple mirrors can alternatively be employed.

The mirror mask (byte "2") in the GDAT/LDAT table 500 of FIGS. 9A–B includes three fields. First, the "secondary mirror number" field identifies the mirror number of the secondary logical volume that serves as a mirror of the primary logical volume when a DC/BCV connection has been established. Second, the "primary mirror number" field indicates the mirror number of the primary logical volume that the mirror of the secondary logical volume is assigned to. Like the mirror number in the tables of FIGS. 4A–B, this number will be the next highest available number after the mirrors already established for the primary volume. Finally, a "not active mirror mask" field identifies which mirrors of the secondary volume (e.g., DV2) are not established as mirrors of the primary volume (e.g., DV1) when a DC/BCV connection is established. This entry "masks out" all mirrors of the secondary logical volume except for the one identified in the secondary mirror number entry. These "masked out" mirrors are deactivated while the DC/BCV connection is established, and are reactivated when the DC/BCV connection is de-established. As should be appreciated from the foregoing, all of the fields in the mirror mask (byte "2") pertain solely to the secondary volume, so that as shown in FIG. 9A, these entries are don't cares for the primary volumes.

In the example shown in FIGS. 9A–B, the entries for the primary (DV1) and secondary (DV2) DC/BCV volumes include values in (bytes "4–5") that point to one another, indicating that a DC/BCV connection is established between them. Mirror M1 of logical volume DV2 is established as mirror M3 of logical volume DV1.

The GDAT/LDAT illustrated in FIGS. 9A–B also include other DC/BCV flag fields (not shown in FIGS. 9A–B, but illustrated in FIG. 7) in bytes "0" and "3" that are used to implement standard DC/BCV operations. The specifics of these flag fields are particular to the nature of the DC/BCV operation and are not relevant to the present invention. Thus, these fields will not be discussed further so as not to obfuscate the invention.

As discussed above, the description of the specific GDAT/LDAT fields and formats are provided for merely illustrative purposes. The present invention is not limited to using these specific tables, as other table configurations are possible.

As further discussed above, the present invention is directed to an improved method and apparatus for managing the dynamic assignment of resources in a storage system. According to a further embodiment of the invention, when the mass storage system is powered up, re-booted or subject to an initial microcode loading (IML), care is taken to ensure that valid and identical information is included in the GDAT and in each of the LDATs of the system. In one embodiment of the invention, the locally stored dynamic table is identical to the globally accessible table. This is advantageous because it enables CRC checking (discussed below) to be used to efficiently compare the contents of an LDAT with the GDAT. In another embodiment of the present invention, each time a disk adapter is powered up, either when it is a replacement for a failed device or when the entire mass storage system (FIG. 1) is powered up, re-booted or subject to an initial microcode loading (IML), the disk adapter looks to the globally accessible table to ensure that the disk adapters LDAT is up-to-date.

Below is a description of a number of routines that can be employed to implement the present invention. It should be appreciated that the specific steps employed by these routines are provided for merely illustrative purposes, and that the embodiments of the present invention can be implemented in other ways.

Figure 10:
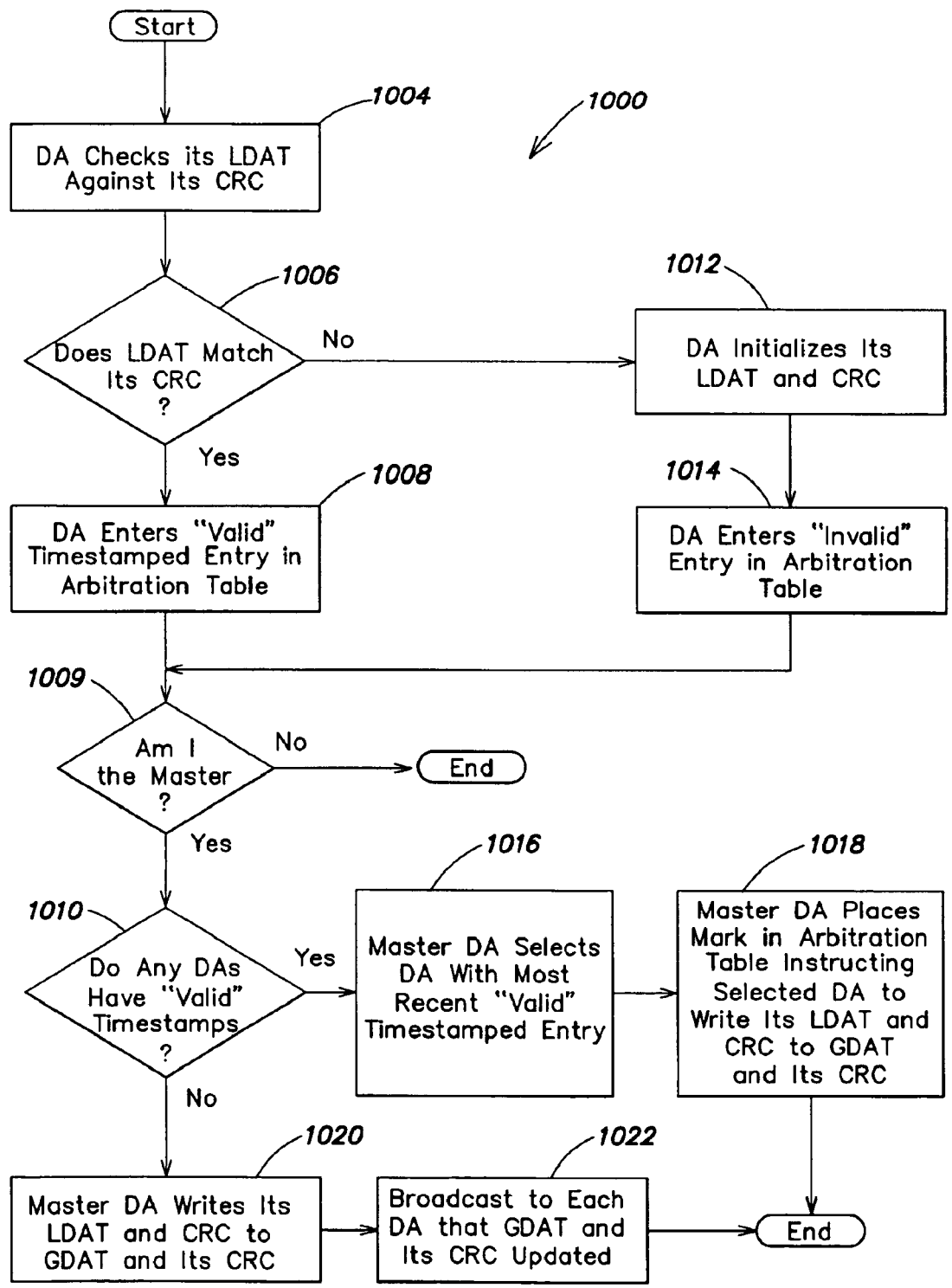
FIG. 10 is a flowchart illustrating a routine implemented by each disk adapter in order to determine the initial contents the global and local dynamic assignment tables in accordance with one embodiment of the present invention.

An example of a routine 1000 for determining the initial contents of the LDATs and the GDAT of a data storage system is shown in FIG. 10. This routine is performed by each disk adapter in the storage system, and is called, for example, whenever the storage system is powered up, re-booted or subject to an initial microcode loading (IML). As will be appreciated following the explanation of the routine 1000, executing this routine in each of the disk adapters determines the contents of the GDAT and each of the LDAT's in the entire system. According to one embodiment, pursuant to routine 1000, the contents of the most recently updated LDAT that contains valid information are copied to the GDAT. The routine 1000 can be implemented in software stored in a local memory 500B (FIG. 6) within each disk adapter, and can be executed on a processor (502) within each disk adapter. Alternatively, dedicated hardware can be provided to implement this routine.

In steps 1004 and 1006, the disk adapter calculates a value of a detection code (e.g., a cyclic redundancy code or "CRC") based upon the data stored in its LDAT, and compares the generated CRC against a CRC value stored in a location (referred to below as the "CRC memory") in local memory 500B in the disk adapter. Many types of error detection codes or CRC's are known, and the present invention is not limited to the use of any particular code. In one embodiment of the invention, the CRC code is a thirty-two bit word that represents the data in the LDAT, which is typically on the order of eight-thousand bytes.

CRC's are used in one embodiment of the present invention in two ways. First, the CRC's provide the ability to determine, as in steps 1004 and 1006, whether one of the dynamic assignment tables has valid data stored in it. In this respect, as discussed below, in one embodiment of the invention, when the LDAT in any of the disk adapters is written, a CRC is generated based upon the data written to the LDAT. Similarly, when the LDAT is read, a CRC is generated and compared against the code value stored in the CRC memory. Thus, so long as the data stored in the LDAT or the CRC memory is not corrupted after the LDAT has been written with valid data, the CRC generated by the data read from the LDAT will match the code value stored in the CRC memory. If the generated and stored codes do not match, it indicates that the data has been corrupted, or that no valid data is stored in the LDAT.

As discussed further below, CRC's also are used by one embodiment of the invention to perform a check of whether the data in the LDAT of a disk adapter matches the data in the GDAT. In this respect, the CRC stored for one of these tables can be compared against the CRC stored for the other, and if the CRC's do not match, it is determined that the tables do not store the same data. By using the CRC values, the contents of the LDAT and GDAT may be compared without requiring an exhaustive entry-by-entry comparison of the tables.

As should be appreciated from the foregoing, upon a power up or other condition of the data storage system that results in the call to the routine 1000, both the LDAT and the CRC memory of a disk adapter may store garbage (i.e., data that is not valid) if the disk adapter is being powered up for the first time, or if the system is undergoing IPL (initial program load). Thus, in that case, the LDAT will not match its CRC in steps 1004 and 1006, causing the routine 1000 to pass to step 1012. In step 1012, the disk adapter initializes its LDAT to reflect that no dynamic assignments have been made, calculates a CRC based upon the data written to the LDAT and updates the CRC memory with the calculated CRC. When writing the LDAT and the CRC memory in step 1012 and elsewhere, the routine stores a time stamp indicating the time that the LDAT and CRC were updated.

After updating the LDAT and CRC memory in step 1012, the routine proceeds to step 1014, wherein the routine enters an entry for the disk adapter into an arbitration table that is accessible to all disk adapters in the storage system. The arbitration table can, for example, be stored in globally accessible memory 100 (FIG. 1). When the routine reaches step 1014, it assumes, based upon the determination that was made in step 1006, that the LDAT contains data that is not valid. Thus, in step 1014, the routine stores in the arbitration table an indication that the stored CRC is not valid.

When it is determined at step 1006 that the calculated value of the CRC for the LDAT matches the stored CRC value, the routine assumes that the LDAT contains valid data and proceeds to step 1008. In step 1008, the routine enters into the globally accessible arbitration table an indication that the CRC is valid, and the time stamp indicating the time that the CRC value was last updated.

Each of the disk adapters executes routine 1000 when the data storage system is powered up, re-booted, or subject to an IML as discussed above. In accordance with one embodiment of the invention, the entries written to the arbitration table are analyzed to determine the most recently updated valid entry. This can be done in any number of ways. In the embodiment of the invention shown in FIG. 10, one of the disk adapters (called the "master DA" performs the function of analyzing the entries in the arbitration table. However, it should be appreciated that the present invention is not limited in this respect, and that this determination function can be done in other ways.

The selection of which disk adapter implements the master DA can be done in a number of ways, and the present invention is not limited to any particular selection scheme. For example, the disk adapter with the lowest "hot spare director number" (FIG. 8) can be selected as the master DA.

In step 1009 of routine 1000, a determination is made as to whether the disk adapter on which the routine is running is the master DA, and when it is not, the routine terminates. In the one disk adapter that is determined to be the master, the routine proceeds to step 1010, wherein a determination is made as to whether any of the disk adapters in the system entered a valid CRC value into the arbitration table. When one or more of the disk adapters of storage system 1 (FIG. 1) did enter a valid CRC value, the routine proceeds to step 1016, wherein the master DA examines the time stamp of each valid entry in the arbitration table to identify the disk adapter that has the most recently updated valid entry in the arbitration table. The routine next proceeds to step 1018, wherein the master disk adapter places a mark in the arbitration table instructing the disk adapter identified in step 1016 to write the contents of its LDAT to the GDAT and its stored CRC value to the memory location storing the CRC of the GDAT, and then terminates.

Each of the disk adapters polls the arbitration table to see whether a mark has been placed in the arbitration table instructing it to write its LDAT/CRC (the LDAT and its associated CRC) to the GDAT/CRC (the GDAT and its associated CRC). The disk adapter marked in step 1018 will write its LDAT/CRC to the GDAT/CRC, and will then issue a broadcast to all disk adapters in the system indicating that the GDAT has been updated. Each disk adapter then will update its LDAT/CRC from the GDAT/CRC.

When the routine executing on the master DA determines in step 1010 that no disk adapter has entered a valid entry in the arbitration table, the routine proceeds to step 1020, wherein the master DA writes its LDAT/CRC to the GDAT/CRC. The routine then proceeds to step 1022, wherein the master DA issues a broadcast to all disk adapters in the system indicating that the GDAT has been updated. Each disk adapter then will update its LDAT/CRC from the GDAT/CRC.

It should be appreciated that in response to the execution of routine 1000, if any of the disk adapters in the mass storage system has valid data in its LDAT/CRC, then the GDAT/CRC is updated by the disk adapter having the most recently updated valid LDAT/CRC, and the LDAT/CRC's of the other disk adapters in the system are also updated accordingly. If none of the disk adapters has valid data in its LDAT/CRC, the GDAT/CRC is updated from the master DA to include the initialized data established in step 1012 (e.g., data indicating that no dynamic assignments had been made), and all of the other LDAT/CRC's are updated accordingly. Thus, all of the disk adapters will be initialized, consistently, to indicate that no dynamic assignments have been made. After routine 1000 has completed, the system begins operation using the dynamic configuration information contained in the LDATs and the GDAT.

It should be appreciated that one advantageous feature of the embodiment of the present invention described above in connection with FIG. 10 is that each of the disk adapters can be updated automatically with the most accurate dynamic assignment information available. As used herein, the reference to automatic updating means that involvement by service personnel and/or the service processor 148 (FIG. 1) is not necessary to update the disk adapters in the system.

In another embodiment of the invention, once the system is operating, steps are taken to ensure the continued validity of the data stored in the LDAT of each disk adapter, and to maintain consistency between the GDAT and each of the LDAT's.

Figure 11:
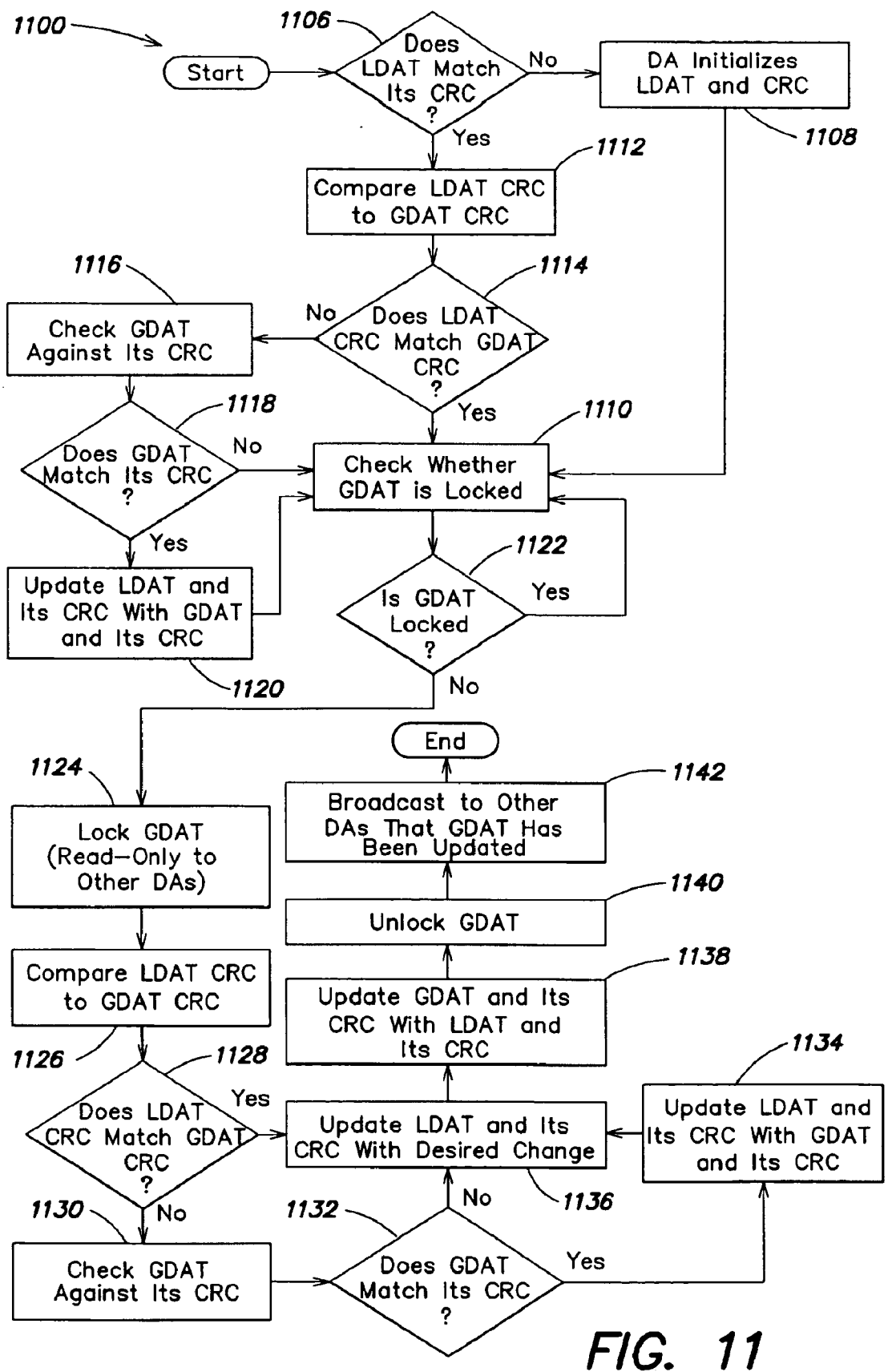
FIG. 11 is a flowchart illustrating a routine that is implemented by each disk adapter prior to updating its local dynamic assignment table.

An example of a routine 1100 for checking validity of the data stored in the LDAT of each disk adapter, and for maintaining consistency between the GDAT and each of the LDAT's, is shown in FIG. 11. This routine is performed by each disk adapter in the storage system, and is called by a disk adapter that seeks to update its LDAT. Like routine 1000, routine 1100 can be implemented in software stored in the local memory 500B within each disk adapter, and can be executed on the processor 502 within each disk adapter. Alternatively, dedicated hardware can be provided to implement this routine.

Initially, in step 1106, the disk adapter that desires to make a change to its LDAT performs a self-check (as described above) by generating a CRC value based on the data stored in its LDAT, and comparing the generated CRC with the value in the CRC memory. When these two CRC values do not match, the LDAT is assumed to contain invalid data, and the routine proceeds to step 1108, wherein both the LDAT and its stored CRC are initialized to reflect that no dynamic assignments are made, in the manner described above. When the current and stored CRC values match, the LDAT is assumed to store valid data, and the routine proceeds to step 1112, wherein the stored value of the LDAT's CRC is compared with the stored value of the GDAT's CRC.

As shown in step 1114, when the stored value of the LDAT's CRC is not identical to the stored value of the GDAT's CRC, the routine proceeds to step 1116, wherein the routine checks whether the GDAT contains valid data. That is, in step 1116, the disk adapter calculates a current value for the GDAT's CRC and compares it with the stored CRC value for the GDAT. As illustrated in step 1118, when the GDAT is found to contain valid data, the routine proceeds to step 1120, wherein the LDAT/CRC of the disk adapter is updated with the contents of the GDAT/CRC. Thus, the LDAT of the disk adapter will be updated with valid data from the GDAT before the write to the LDAT takes place later in the routine 1100.

When the GDAT is found to contain invalid data in step 1118, or when the stored value for the LDAT CRC is found to match the stored value of the GDAT CRC in step 1114, or after the disk adapter initializes its LDAT and stored CRC value in step 1108, the routine proceeds to step 1010, wherein the routine begins the initial steps for modifying the LDAT.

In the embodiment of the invention shown in FIG. 11, each disk adapter that updates its LDAT will also update the GDAT, and will cause the other disk adapters to update their LDATS in response to the updating of the GDAT. Furthermore, in this embodiment of the invention, a locking scheme is employed to ensure that only one disk adapter can issue a write to the GDAT at a time. Thus, the use of a locking scheme is advantageous because as discussed below, each update to the GDAT occurs by first updating the LDAT of the disk adapter that performs the update, and then copying the values in the LDAT to the GDAT. Thus, if the GDAT were not locked, two consecutively executed writes could lead to the GDAT being updated with the first write at a time that is too late to be detected by the disk adapter that performs the second write, leading to the second write updating the GDAT in a manner that results in a loss of the information updated by the first write. In steps 1110 and 1122, a determination is made as to whether the GDAT has been locked by another disk adapter in the system. It should be appreciated that another disk adapter might concurrently be performing this same routine 1100, and might already have locked the GDAT in preparation for writing to the GDAT. In the embodiment of the invention shown in FIG. 11, a locking technique is employed to ensure that only one disk adapter can update the GDAT at a time. However, reads from the GDAT need not issue a lock. Furthermore, as will be seen from the discussion below, if a subsequent write changes the GDAT after it is read by a disk adapter, the updates will be broadcast to that disk adapter (and all others) to ensure that it has the up-to-date information. Thus, in one embodiment of the invention, when a disk adapter locks the GDAT, other disk adapters still may read from the table, and are only prevented from writing to the GDAT. It should be appreciated that this locking feature can be accomplished in any of a number of ways.

When the disk adapter (in step 1122) finds the table to be unlocked, the routine proceeds to step 1124, wherein the disk adapter locks the GDAT, making the GDAT "read-only" to the other disk adapters in the system. After the GDAT is locked in step 1124, the routine proceeds to step 1126, wherein the stored value of the LDAT's CRC again is compared with the stored value of the GDAT's CRC to make certain that another disk adapter has not updated the GDAT since these two values were compared in step 1112.

When the stored value of the LDAT's CRC is not identical to the stored value of the GDAT's CRC, the routine proceeds (in step 1128) to step 1130, wherein the disk adapter checks whether the GDAT contains valid data. As discussed above, this can be done by calculating a current value for the GDAT's CRC, and comparing it with the stored value for the GDAT's CRC. As illustrated in step 1132, when the GDAT is found to contain valid data, the routine proceeds to step 1134, wherein the LDAT/CRC of the disk adapter is updated with the contents of the GDAT/CRC. In this manner, the LDAT is updated to ensure that it has the most recent data in the GDAT, prior to the routine updating the LDAT and then copying that information to the GDAT.

When the GDAT is found to contain invalid data, or when it is determined at step 1128 that the stored value for the LDAT's CRC matches the stored value of the GDAT's CRC, the routine proceeds to step 1136, wherein the disk adapter updates its LDAT/CRC with the desired change(s) that caused the routine to be called. The disk adapter (in step 1138) then updates the GDAT/CRC with the contents of its LDAT/CRC. Next, the disk adapter unlocks the GDAT in step 1140, and then proceeds to step 1142, wherein the disk adapter broadcasts to the other disk adapters in the system that the contents of the GDAT have been changed, and then terminates. In response to this broadcast, each disk adapter will update its LDAT/CRC from the GDAT/CRC.

It should be appreciated from the foregoing that the routine 1100 of FIG. 11 operates in a manner to ensure that coherency is maintained between the LDATs in all of the disk adapters in the system 1 (FIG. 1). In this respect, before a disk adapter updates its LDAT, it ensures that if the GDAT has valid data that is different from the LDAT, the LDAT is first updated from the GDAT before the local updates are made. Thereafter, the updated LDAT is copied to the GDAT, and from there, is used to update all the other LDATs in the system. In addition, by locking the GDAT, the routine ensures that concurrent writes from different disk adapters will not result in some updates being lost.

Figure 12:
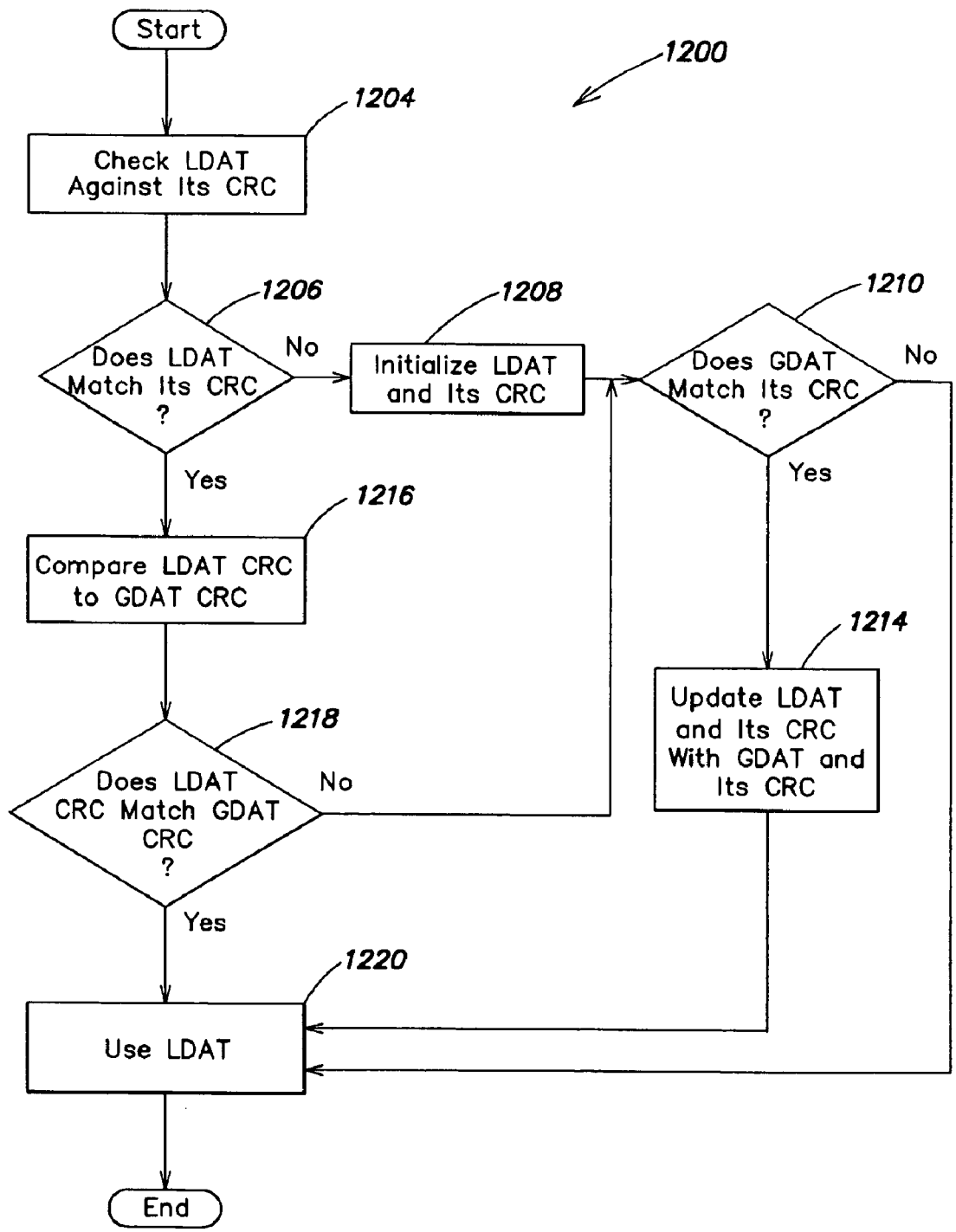
FIG. 12 is a flowchart illustrating a routine implemented by each disk adapter before accessing its local dynamic assignment table.

As seen from the foregoing, in the above-described situation relating to updates of the LDAT of a disk adapter, in the event of a conflict between valid data in the LDAT and the GDAT, the GDAT generally is relied upon as containing the most accurate information in the system regarding dynamic assignments. Thus, before a disk adapter updates its LDAT, it ensures that if the GDAT has valid data that is different from the LDAT, the LDAT is first updated from the GDAT before the local updates are made. In another embodiment of the invention illustrated by a routine 1200 shown in FIG. 12, the values of each LDAT being read are also compared against the GDAT, and if the GDAT includes valid data that is different from the LDAT, the LDAT is first updated from the GDAT before being used.

Routine 1200 is called each time a disk adapter seeks to read its LDAT (e.g., to determine the dynamic configuration information for the system). When a disk adapter indeed desires to use information contained in its LDAT, it first self-checks the LDAT (in step 1204) to see whether it contains valid configuration information. This self-check is done by comparing a current CRC value for the disk adapter's LDAT with the stored value of its CRC. As shown in step 1206, when the LDAT does not pass this self-check, the routine proceeds to step 1208, wherein the disk adapter initializes its LDAT and its stored CRC to reflect that no dynamic assignments are made.

In step 1210, a determination is made as to whether the GDAT contains valid information (i.e, does it match its CRC). When it is determined that the GDAT is also invalid, the routine proceeds to step 1220, wherein the disk adapter uses its LDAT (as initialized in step 1208), rather than relying on the GDAT which was determined to contain invalid information (in step 1210).

When it is determined at step 1210 that the GDAT contains valid data, the routine proceeds to step 1214, wherein the LDAT is updated with the contents of the GDAT. Then method then proceeds to step 1220, wherein the LDAT is used (as updated from the GDAT) according to the read request that called the routine.

When it is determined at step 1206 that the LDAT has valid data, the routine proceeds to step 1216 wherein the stored CRC value for the disk adapter's LDAT is compared with the stored CRC value for the GDAT to see whether the LDAT includes the same data as the GDAT. As illustrated in step 1218, when the LDAT and the GDAT do not store the same data, the routine proceeds to step 1210, wherein the GDAT is checked to see whether it contains valid information. If the GDAT contains valid information, then (in step 1214) the LDAT/CRC is updated from the GDAT/CRC. Otherwise, the routine proceeds to step 1220 wherein the LDAT is used to perform the read operation without updating its contents from the GDAT. If (in step 1218) the LDAT and the GDAT do store the same data, then the routine proceeds to step 1214, wherein the disk adapter accesses the LDAT according to the read request that called the routine. Thus, according to routine 1200, if the GDAT contains valid information that is different than the information contained in the LDAT, the LDAT will be updated according to the contents of the GDAT. Also, if the GDAT contains invalid information, then the disk adapter will use the current contents of its LDAT (if valid) or will initialize and then use the contents of its LDAT (if invalid).

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A storage system to store information written by a data processing system to a plurality of logical volumes, wherein the data processing system accesses the plurality of logical volumes in the storage system using a logical volume address, the storage system comprising:
   a plurality of storage devices that store the plurality of logical volumes;
   a plurality of controllers that each is coupled to at least one of the plurality of storage devices and controls access to the one of the plurality of storage devices; and
   a memory that stores a dynamic configuration table that includes information specifying dynamic assignments of resources in the storage system, the dynamic configuration table being indexed by the logical volume address, the dynamic assignments of resources in the storage system including one of a dynamic assignment of at least a portion of one of the plurality of storage devices to store at least a portion of one of the plurality of logical volumes, and a dynamic assignment of at least one logical volume to form a logical connection with another logical volume.

2. The storage system of claim 1, wherein each of the plurality of storage devices is a disk drive.

3. The storage system of claim 1, wherein the memory is globally accessible to each of the plurality of controllers.

4. The storage system of claim 1, wherein the resources dynamically assigned include at least a portion of one of the plurality of storage devices that is dynamically and temporarily assigned to store one of the logical volumes.

5. The storage system of claim 1, wherein the resources dynamically assigned include at least one logical volume that is dynamically assigned to form a logical connection with another logical volume.

6. The storage system of claim 1, wherein each of the plurality of controllers includes a local memory that stores a local dynamic configuration table that includes information specifying the dynamic assignments of resources in the storage system, each of the local dynamic configuration tables being indexed by the logical volume address.

7. The storage system of claim 6, wherein each of the local dynamic configuration tables is identical to the dynamic configuration table stored in the memory.

8. A storage system to store information written by a data processing system to a plurality of logical volumes, wherein the data processing system accesses the plurality of logical volumes in the storage system using a logical volume address, the storage system comprising:
   a plurality of storage devices that store the plurality of logical volumes;
   a plurality of controllers that each is coupled to at least one of the plurality of storage devices and controls access to the one of the plurality of storage devices;
   a memory; and
   means for creating, in the memory, a dynamic configuration table that includes information specifying dynamic assignments of resources in the storage system, the dynamic configuration table being indexed by the logical volume address, the dynamic assignments of resources in the storage system including one of a dynamic assignment of at least a portion of one of the plurality of storage devices to store at least a portion of one of the plurality of logical volumes, and a dynamic assignment of at least one logical volume to form a logical connection with another logical volume.

9. The storage system of claim 8, wherein each of the plurality of storage devices is a disk drive.

10. The storage system of claim 8, wherein the memory is globally accessible to each of the plurality of controllers.

11. The storage system of claim 8, wherein the resources dynamically assigned include at least a portion of one of the plurality of storage devices that is dynamically and temporarily assigned to store one of the logical volumes.

12. The storage system of claim 8, wherein the resources dynamically assigned include at least one logical volume that is dynamically assigned to form a logical connection with another logical volume.

13. The storage system of claim 8, wherein each of the plurality of controllers includes a local memory, and wherein the storage system further includes means for creating, in each of the local memories, a local dynamic configuration table that includes information specifying the dynamic assignments of resources in the storage system, each of the local dynamic configuration tables being indexed by the logical volume address.

14. The storage system of claim 13, wherein the storage system includes means for creating each of the local dynamic configuration tables to be identical to the dynamic configuration table stored in the memory.

15. A storage system, comprising:
   at least first and second storage devices;
   at least first and second controllers, each one of the controllers capable of controlling at least one storage device and having a set of ports connectable to the at least one storage device and through which the one of the controllers can be configured to control the at least one storage device, wherein the set of ports for the first controller and the set of ports for the second controller each include at least one port, each of the first and second controllers including a local memory to store a local table that includes information that specifies dynamic assignments of resources in the storage system; and
   a memory to store a global table that stores information that specifies the dynamic assignments of resources in the storage system, the memory being accessible by each of the first and second controllers;
   wherein each one of the first and second controllers includes updating means, responsive to the one of the first and second controllers being powered up, for automatically updating the local table in the one of the first and second controllers based upon the information stored in the global table;
   wherein the first storage device is coupled to at least one of the set of ports for the first controller so as to permit the first controller to control access to the first storage device;
   wherein the first storage device is not coupled to the second controller in a manner that would permit the second controller to control access to the first storage device, so that the second controller cannot control access to the first storage device;

wherein the second storage device is coupled to at least one of the set of ports for the second controller so as to permit the second controller to control access to the second storage device; and wherein the second storage device is not coupled the first controller in a manner that would permit the first controller to control access to the second storage device, so that the first controller cannot control access to the second storage device.

16. The storage system of claim 15, wherein the updating means in each one of the first and second controllers includes means for, when the global table includes valid information, copying information from the global table to the local table in the one of the first and second controllers.

17. The storage system of claim 16, wherein the updating means in each one of the first and second controllers includes means for, when the local table does not include valid information, initializing the information in the local table in the one of the first and second controllers to indicate that no dynamic assignments have been made.

18. The storage system of claim 17, wherein the updating means in each one of the plurality of controllers includes means for, when the local table does not include valid information, initializing the information in the local table in the one of the plurality of controllers to indicate that no dynamic assignments have been made.

19. The storage system of claim 15, wherein each one of the first and second controllers includes matching means for determining whether the information stored in its local table matches the information in the global table.

20. A method of managing a storage system including at least first and second storage devices, and at least first and second controllers, each one of the controllers capable of controlling at least one storage device and having a set of ports connectable to the at least one storage device and through which the one of the controllers can be configured to control the at least one storage device;

wherein the first storage device is coupled to at least one of the set of ports for the first controller so as to permit the first controller to control access to the first storage device;

wherein the first storage device is not coupled to the second controller in a manner that would permit the second controller to control access to the first storage device, so that the second controller cannot control access to the first storage device;

wherein the second storage device is coupled to at least one of the set of ports for the second controller so as to permit the second controller to control access to the second storage device;

wherein the second storage device is not coupled to the first controller in a manner that would permit the first controller to control access to the second storage device, so that the first controller cannot control access to the second storage device;

wherein the set of ports for the first controller and the set of ports for the second controller each include at least one port, and each of the first and second controllers include a local table that includes information that specifies dynamic assignments of resources in the storage system; and wherein the storage system further includes a global table that stores information that specifies the dynamic assignments of resources in the storage system and is accessible by each of the first and second controllers;

the method comprising a step of:

(A) when one of the first and second controllers is powered up, automatically updating the local table in the one of the first and second controllers based upon the information stored in the global table.

21. The method of claim 20, wherein step (A) includes a step of, when the global table includes valid information when the one of the first and second controllers is powered up, copying information from the global table to the local table in the one of the first and second controllers.

22. The method of claim 21, wherein step (A) includes a step of, when the local table does not include valid information, initializing the information in the local table in the one of the first and second controllers to indicate that no dynamic assignments have been made.

23. The method of claim 20, wherein the storage system stores information written by a data processing system that accesses units of information in the storage system using a logical volume address, and wherein the method further includes a step of indexing the global table and each of the local tables by the logical volume address.

* * * * *